United States Patent [19]
Jacobson et al.

[11] 4,093,357
[45] June 6, 1978

[54] CERMET INTERFACE FOR ELECTRO-OPTICAL DEVICES

[75] Inventors: Alexander D. Jacobson, Topanga; Jan Grinberg; Paul O. Braatz, both of Los Angeles; William P. Bleha, Jr., Carlsbad, all of Calif.

[73] Assignee: Hughes Aircraft Company, Culver City, Calif.

[21] Appl. No.: 784,894

[22] Filed: Apr. 5, 1977

[51] Int. Cl.² ............................................... G02F 1/13
[52] U.S. Cl. ...................................... 350/338; 350/1.7; 350/342
[58] Field of Search ................. 350/160 LC, 160 R; 250/213 R

[56] References Cited
U.S. PATENT DOCUMENTS

| 3,824,002 | 7/1974 | Beard | 350/160 LC |
| 3,976,361 | 8/1976 | Fraas et al. | 350/160 LC |

OTHER PUBLICATIONS

Zeeler et al.: "Optical Properties of Electrically Insulating Granular Metal Films," *Journal of Applied Physics*, vol. 44, Jun., 1973, pp. 2763–2764.

*Primary Examiner*—Edward S. Bauer
*Attorney, Agent, or Firm*—Donald C. Keaveney; W. H. MacAllister

[57] ABSTRACT

There is disclosed an anisotropically conductive interface comprising a plurality of cermet and dielectric layers for use in electro-optical devices to separate a substrate driver from an electro-optical display medium to prevent display light from affecting the driver. The substrate may be a photosensor, a charge coupled device or other matrix addressing circuitry arrangement. In general the substrate is one which can provide spatially modulated voltage and/or current patterns. The display medium may be a liquid crystal, an electrochromic, an electro-luminescent material or the like. The interface provides direct current conductivity through the interface, insulative maintenance of the spatial modulation of the signal across the interface, light reflectivity, and high attenuation of transmitted light.

5 Claims, 1 Drawing Figure

U.S. Patent
June 6, 1978
4,093,357
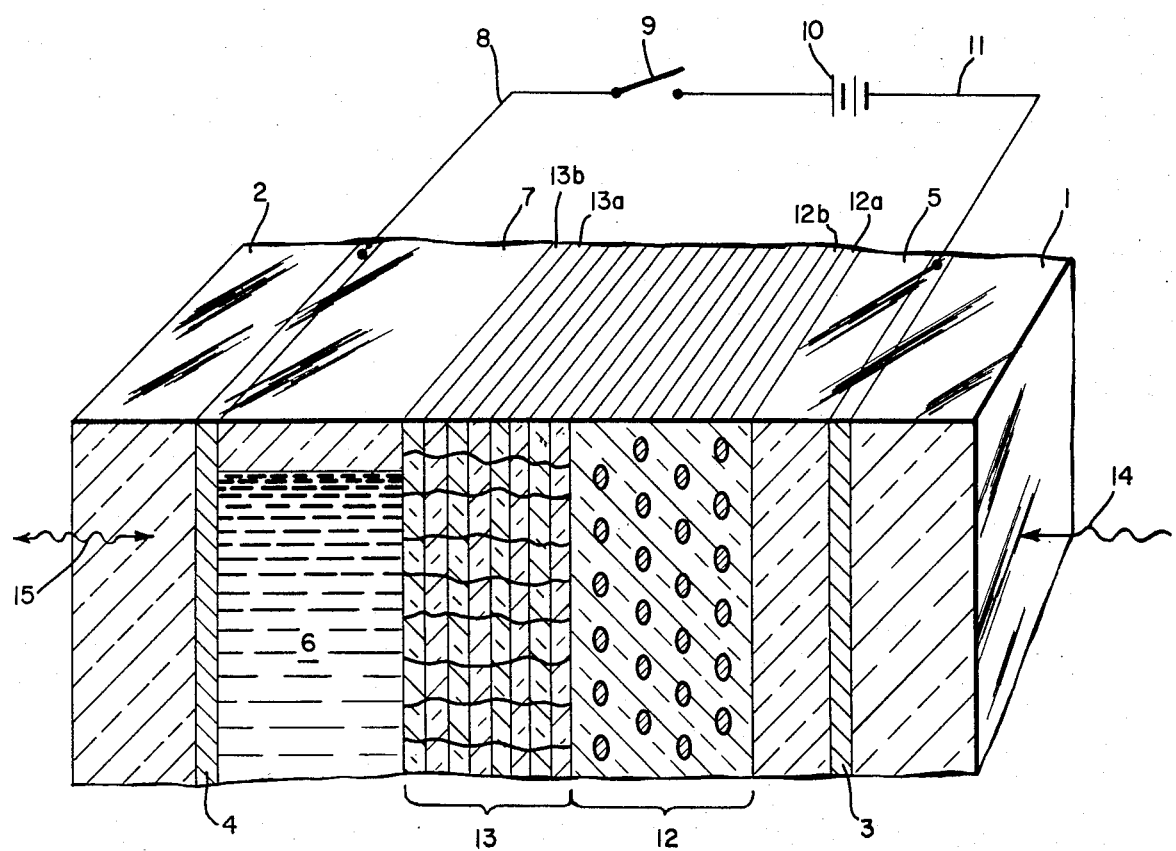

CERMET INTERFACE FOR ELECTRO-OPTICAL DEVICES

BACKGROUND OF THE INVENTION

In U.S. Pat. Nos. 3,824,002 issued to Terry D. Beard on July 16, 1974 and in U.S. Pat. No. 3,976,361 issued to L. M. Fraas et al on Aug. 24, 1976, there are disclosed alternating current liquid crystal light valves which include a photo-sensitive substrate and a liquid crystal electro-optical medium. An image is applied as an input to the photo-sensitive substrate and resulting electrical signals are applied across the liquid crystal layer to modulate projection light which is transmitted through the liquid crystal layer to a dielectric mirror from which it is reflected back out of the liquid crystal layer. In these light valves it is necessary to use alternating current fields because the dielectric mirror used to reflect the projection light is an insulator that blocks a DC potential from the liquid crystal. A metal mirror could be used instead of the dielectric mirror to facilitate switching DC, but then the mirror would have to be a matrix of metal pads (to avoid shorting of all of the image signal in the photoconductor plane), and a matrix mirror creates a number of unwanted and very difficult device problems which in practical devices using liquid crystal layers of a thickness of 2 microns or less, would be almost insuperable.

The present invention overcomes these problems and permits the use of DC driving voltages in a reflection mode light valve by the use of a light-blocking layer and a dielectric mirror which have anisotropic conductivity. Thus, they maintain the high sheet resistivity of an ordinary dielectric layer, while providing high DC conduction perpendicular to the film plane.

In order to maintain independence between the read out function and the input function of light valves or similar devices, one must maintain the device as a reflection mode light valve. Thus, it must have an internal mirror between the electro-optic medium and the substrate. With the present invention one can obtain high DC conductivity through the mirror and very high resistivity along the surface of the mirror. One disadvantage of the matrix approach suggested above is that it is optically visible at the magnifications that are involved when the light valve is used to project an image onto a large screen. More importantly, the edges of the matrix element form discontinuities across which it is extremely difficult to obtain uniform liquid crystal alignment such as is necessary in birefringence type devices. Also, those edges cause enhanced electric fields which reduce device lifetime. Finally, the matrix mirror approach creates a projection light leakage problem through to the photoconductor at the interstices in the array of matrix elements.

It is an object of the present invention to provide a light blocking and/or light reflecting element for use as an interface between a photosensitive substrate and an electro-optical medium in electro-optical devices such as a liquid crystal light valve, which interface overcomes the above-noted problems of previously recognized alternatives.

SUMMARY OF THE INVENTION

These and other objects and advantages are achieved by providing as a light blocking member having a plurality of layers each comprising a pair of sequentially alternate films, the first film being a pure dielectric, the second a metal island film, followed again by dielectric and another metal island film and so forth. A dielectric mirror which is also anisotropically conductive may be formed on the light blocking member by suitable dielectric films containing metal which may be cosputtered with the dielectric. The interface so formed may be used between a photosensitive substrate and an electro-optical medium. The substrate may be either of the type disclosed in either of the above patents or in the form of photo diodes, or photo conductors, or matrix drive elements, or charge coupled devices and the like. The electro-optical display medium may be a liquid crystal, an electro-chromic, an electro-luminescent material, or the like. The interface affords anisotropic conductivity. In the direction perpendicular to the layers of films the DC conductivity is good; in the lateral direction across the films the sheet resistance is high in order to maintain good spatial signal separation. The interface is thus able to provide a light reflector and/or high attenuation coefficient for transmitted projection light in a DC reflective device by providing DC conductivity through the cermet layers while maintaining good spatial modulation of the signal.

BRIEF DESCRIPTION OF THE DRAWINGS

These and other features, objects and advantages will be more fully apparent to those skilled in the art from the detailed description below taken in connection with the accompanying drawings wherein the single FIGURE is a broken-away sectional perspective view through an exemplary light valve device embodying the interface of the present invention.

DETAILED DESCRIPTION OF THE INVENTION

In the single FIGURE of the drawing there is shown a broken-away sectional perspective view of a portion of a liquid crystal light valve which incorporates the interface of the present invention. It will, of course, be understood that this particular device is exemplary only and that the interface may in fact be used in many different kinds and types of devices.

The liquid crystal light valve shown in the drawing is fabricated between two plain parallel glass plates 1 and 2. Each of these plates has a transparent electrode film, 3 and 4 respectively, deposited on its inner surface. These transparent electrodes may be formed by tin-doped indium oxide having from 100 to 1,000 ohms per square resistivity. Electrode 4 is connected through conductor 8 and switch 9 to one terminal of the direct current source 10, the other terminal of which is connected through conductor 11 to electrode 3.

Formed on the electrode 3 is a photosensitive element 5 which can be either a silicon P-N photodiode or a deposited silicon or cadmium sulphide photosensitive thick film charge storage diode of the type described in detail in the above referenced U.S. Pat. No. 3,976,361. As noted above, the element 5 may also in appropriate devices consist of a photoconductor, a matrix drive, charge coupled device drive or the like. The light blocking means 12 and the dielectric mirror means 13 of the present invention are formed on the photosensor element 5. A film of liquid crystal or other electro-optic medium 6 is retained between the dielectric mirror 13 and the transparent electrode 4 on glass cover plate 2 by a spacer element 7 which in fact extends around all four edges of the device so as to form an enclosed chamber containing the liquid crystal 6. The thickness of the liquid crystal layer is, of course, equal to the width of the spacer element 7. Spacer element 7 forms with the cover plates 1 and 2 a structurally rigid package for the electro-optical device.

An optical input signal 14 such as a light beam or an optical image is impinged through glass cover plate 1 and transparent electrode 3 onto the photosensor 5. Variation of intensity of the optical input signal 14 with time or position on the photosensor 5 will produce a local variation at each point in the impedance of the photosensor proportional to the variation in intensity. It will be noted that the photosensor and the liquid crystal are in effect connected as a voltage divider across the battery or DC source 10. Therefore, when no optical signal 14 is applied the impedance of the photosensor is high and a samll portion of the voltage appears across liquid crystal 6. When the intensity of the input signal 14 is increased, the impedance of the photosensor 5 is reduced and more of the voltage appears across the liquid crystal material 6 thereby activating whatever property of the material is being used in the particular device. That is to say, the voltage may exceed that required for the threshold for dynamic scattering to begin or it may, if the device has been so fabricated, result in a variation of the birefringence of liquid crystal material 6.

Whatever the property of the liquid crystal material being used, projection light from beam 15 is applied to the device through glass plate 2 and is transmitted through the liquid crystal material 6 to the dielectric mirror 13 where it is reflected back through the liquid crystal material 6, transparent electrode 4, and glass cover plate 2 after having been electro-optically modulated by the modulation in the property of the liquid crystal material resulting from the above discussed change in the voltage drop across it.

The light blocking means 12 is fabricated on the continuous photosensor 5 in the particular exemplary device shown in the drawing. The light blocking layer 12 consists of a plurality of pairs of sequentially alternate thin metal island films 12a and dielectric films 12b. Since the metal islands are physically separated, (the interstices between them being filled in by dielectric from deposition of the next pure dielectric film) they do not provide lateral conductive paths. This separation should be about 500 Angstrom units or more to achieve this effect. But because the pure dielectric films are thin, in the transverse direction, conduction from a metal island in one of the films 12a to a metal island in the next 12a type film (between which is the pure dielectric film of type 12b) is possible by electron tunneling. In order to permit such electron tunneling, the dielectric films of type 12b should not have a thickness in excess of 150 Angstrom units.

These alternate types of films may be deposited by techniques which are very similar to those described by H. R. Zeeler and D. Kuse in a paper entitled "Optical Properties of Electrically Insulating Granular Metal Films" published in the *Journal of Applied Physics,* Vol. 44, No. 6, June 1973 beginning at page 2763. The abstract of that paper reads, "By successive evaporation of metal and dielectric we have made films consisting of many layers of small metal particles insulated from each other. Such films are opaque in the visible and near infrared, but electrically insulating. We have measured the dependence of the optical properties on metal particle size and metal-to-insulator volume ratio. The results can be qualitatively understood in terms of the Maxwell-Garnett theory. Possible technical applications are discussed". The intended applications which are discussed in the text are referred to as cheap infrared low-pass filters, electrically insulating layers opaque for the visible and near infrared, and of reasonably high emissivity in the opaque region. Such films are suggested as having use in infrared emission microscopy. In the present invention, it is not desired to make the composite layer of alternate films an electrical insulator, but rather an anisotropic electrical conductor having conductivity through the layer but not across it. In order to do this the dielectric film must be reduced from the thicknesses used by Zeller and Kuse to a value not greater than 150 Angstrom units to permit electron tunneling through the film as noted above. When such a change is made the other properties of the film make it very useful as an interface in electro-optical devices of the type described above.

As noted above, the high conductivity through the interface is possible because of electron tunneling through the thin pure dielectric layers 12b between metal islands or particles in adjacent metallized films 12a. Light blocking is achieved because the metal islands are opaque even though the dielectric films as such are thin enough to be transparent. Since the islands are randomly distributed in a particular layer, a number of pairs of layers of the metal and dielectric films of the type shown at 12a and 12b can be deposited to achieve high opacity. In a particular embodiment, a structure of forty alternating tin metal island films having an amount of metal equivalent to that in a solid film of 150 Angstrom units thick of the type shown at 12a and of aluminum oxide films 150 Angstroms thick of the type shown at 12b were fabricated by electron beam deposition. Of course, in the metal island film, each island has a greater than average thickness because the metal coagulates to form the island. A tin film of this thickness has a transmission of 50% and a sheet resistivity of greater than $10^{12}$ ohms per square. The completed multilayer structure exhibited a sheet resistivity of greater than $10^{11}$ ohms per square and a resistivity of $5 \times 10^4$ ohms per square inch perpendicular to the film plane. The absorption throughout the visible wavelength region was greater than $10^5$ Neutral Density. Thus, in accordance with the present invention, we were able to fabricate an opaque layer 12 with seven orders of magnitude of conduction anisotropy.

Following the light blocking means 12, a unique dielectric mirror 13 is formed. It consists of a conventional dielectric mirror configuration of alternate high and low index quarter-wave dielectric films 13a and 13b respectively. However, to realize the conduction benefits of the light blocking means 12, the mirror 13 must also be rendered conductive to direct current voltages. This is done by introducing a small percentage (less than 50%) of metal into each of the dielectric layers during film deposition to form a "cermet" film. The metal tends to grow on itself and thus provide metal filaments such as the filament 16 which are actually formed on an atomic scale through the alternate film layers 13a and 13b. These filaments act as low resistivity paths through the film. Again, because the filaments are independent, high sheet resistivity is maintained in the mirror. A small amount of metal in the mirror will not appreciably effect the optical constants of film.

One method of forming these films is to co-sputter a metal along with the dielectric material. A preferred system consists of $SiO_2$ for the low refractive index dielectric, TiO₂ for the high index dielectric, and gold for the metal filaments.

In the light blocking means 12 one is interested in maximum absorption achieved by randomly dispersed metal islands. In the mirror 13 one is interested in minimum absorption and maximum reflectivity achieved by the fact that metal fibers 16 cover only a small fraction of the total plane surface of the mirror and hence absorb very little. Both types of films must be deposited at high temperatures of 300° to 500° C and only certain metals can be used. Tin, gold, and lead will work. Chrome will not. The difference in action of the two members arises from the fact that in the light blocking member the intervening pure dielectric films cause random dispersal of the metal islands hence absorption over the total plane area. In the mirror, all films contain metal which tend to coalesce into continuous fibers 16 thus achieving less absorption and greater reflectivity.

After the dielectric mirror 13 is formed, the device is completed with an electro-optic medium such as a liquid crystal 6 and a transparent counter-electrode comprised of the glass plate 2 and transparent electrode 4. A transparent rigid spacer member of glass or quartz is shown at 7 to space the counter-electrode assembly from the dielectric mirror and provide rigidity to the overall device.

The device operates in a fashion similar to the operation of the AC light valves disclosed in the above-referenced patents to Beard or Fraas et al, but instead of requiring an AC voltage, it allows a light-controlled DC voltage to be gated to the electro-optic medium, such as liquid crystal shown by way of example. The light blocking means and dielectric mirror means provide a spatially continuous element for projection light reflection and at the same time prevent this projection light from reaching the photoconductor and interferring with the input function of the device.

The advantages of the present invention over the prior art are, firstly, that higher voltage switching ratios can be achieved with the use of DC than can be achieved with AC because the capacitive dark current limitation which exists in the AC case is not relevant to the DC case. This allows faster liquid crystal response. Secondly, the use of DC allows one to use a continuous silicon photo-diode for the photosensor element. Thus, one can take advantage of the highly developed, reproducible silicon technology instead of the more problematic cadmium sulfide thin film technology. Silicon response times are also orders of magnitude faster than the cadmium sulfide. This again contributes to the potential of very fast electro-optic imaging devices.

What is claimed is:

1. In an electro-optical device of the type having substrate means for providing spatially and temporally modulated voltage or current patterns, having electro-optical means for presenting a display controlled by said patterns, and having an interface comprising light blocking means and mirror means between said substrate means and said electro-optical display means, the improvement comprising:

said light blocking means comprising a plurality of layers each formed by a pair of sequentially alternating films, the first of said films in each of said pairs comprising a homogeneous dielectric material and the second of said films in each of said pairs comprising a randomly dispersed plurality of islands of a metallic electrical conductor separated by said dielectric material, said islands being spaced sufficiently to minimize the lateral conductivity of said second films and said first dielectric films being thin enough to permit transverse conduction between metal islands in said second films of adjacent layers by electron tunneling through the intervening first dielectric film to render said interface anisotropically conductive, said interface being a good electrical conductor in the transverse direction normal to the plane of its layers and being a good electrical insulator laterally in any direction in the plane of its layers.

2. A device as in claim 1 wherein the first of said films in each of said pairs is a homogeneous dielectric comprising a film of aluminum oxide not more than 150 Angstrom units thick and wherein the second of said films comprises a randomly dispersed plurality of islands of tin, each of said islands having a thickness equivalent to a solid film thickness not greater than 150 Angstrom units.

3. A device as in claim 1 wherein said mirror means comprises:

a plurality of films of dielectric material, sequentially alternate ones of said films having a high index of refraction and the intervening ones of said films having a low index of refraction, each of said films having a thickness equal to a quarter of the wavelength of a predetermined design wavelength; and each of said dielectric films containing a small percentage of a metal dispersed in said dielectric during its deposition so that each film is a cermet film, the metallic content of adjacent films forming low resistivity filamentary paths transversely through said dielectric mirror means but maintaining a high sheet resistivity laterally across the plane of said dielectric mirror means.

4. A device as in claim 3 wherein said low refractive index dielectric films are formed of SiO₂, said high refractive index films are formed of TiO₂, and the metallic content of said films is gold, said gold being introduced into said films by co-sputtering the gold along with the dielectric material when said films are formed.

5. A device as in claim 4 wherein said light blocking means is formed by a plurality of at least 20 layers each formed by a pair of films, the first of said films in each of said pairs being a homogeneous dielectric comprising aluminum oxide having a thickness not greater than 150 Angstrom units and the second of said films in each of said pairs containing a randomly dispersed plurality of islands of tin having a thickness not greater than 150 Angstrom units.

* * * * *